(12) United States Patent
Nakajima

(10) Patent No.: US 12,350,972 B2
(45) Date of Patent: Jul. 8, 2025

(54) TIRE

(71) Applicant: Sumitomo Rubber Industries, Ltd., Kobe (JP)

(72) Inventor: Koichi Nakajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 227 days.

(21) Appl. No.: 18/130,069

(22) Filed: Apr. 3, 2023

(65) Prior Publication Data

US 2023/0339268 A1 Oct. 26, 2023

(30) Foreign Application Priority Data

Apr. 25, 2022 (JP) .................................. 2022-071748

(51) Int. Cl.
  *B60C 11/13* (2006.01)
  *B60C 11/03* (2006.01)
  *B60C 11/11* (2006.01)

(52) U.S. Cl.
  CPC ...... *B60C 11/1307* (2013.01); *B60C 11/0306* (2013.01); *B60C 11/11* (2013.01); *B60C 2011/133* (2013.01)

(58) Field of Classification Search
  CPC ............. B60C 11/1307; B60C 11/0309; B60C 2011/133
  See application file for complete search history.

(56) References Cited

U.S. PATENT DOCUMENTS

| | | | |
|---|---|---|---|
| 5,031,680 A | 7/1991 | Kajikawa et al. | |
| 2001/0032691 A1* | 10/2001 | Ohsawa | B60C 11/13 152/209.18 |
| 2004/0238092 A1* | 12/2004 | Colombo | B60C 11/1384 152/209.15 |
| 2005/0081971 A1* | 4/2005 | Heinen | B60C 11/24 152/209.1 |
| 2018/0086151 A1 | 3/2018 | Oji et al. | |
| 2022/0080778 A1 | 3/2022 | Nakajima | |

FOREIGN PATENT DOCUMENTS

| | | | | |
|---|---|---|---|---|
| DE | 102015210044 A1 | * | 12/2016 | |
| EP | 1048488 A2 | * | 11/2000 | ............. B60C 11/11 |
| EP | 3 100 872 A1 | | 12/2016 | |
| JP | 9-136515 A | | 5/1997 | |
| JP | H09-136515 | * | 5/1997 | |
| JP | 2006224791 A | * | 8/2006 | |

OTHER PUBLICATIONS

English machine translation of JP2006-224791. (Year: 2006).*
English machine translation of DE102015210044. (Year: 2016).*
English machine translation of JPH09-136515. (Year: 1997).*
Extended European Search Report for European Application No. 23168266.7, dated Sep. 8, 2023.

* cited by examiner

*Primary Examiner* — Robert C Dye
(74) *Attorney, Agent, or Firm* — Birch, Stewart, Kolasch & Birch, LLP

(57) ABSTRACT

A tire is provided with blocks in a tread portion. Each of the blocks has a block wall surface provided with first recesses. Each of the first recesses extends across a block ground contacting surface and the block wall surface. Each of the first recesses has a triangular ground contacting surface opening on the block ground contacting surface and a triangular wall surface opening on the block wall surface. The wall surface opening has a first end terminating without reaching a groove bottom of one of grooves demarcating the each of the blocks.

19 Claims, 7 Drawing Sheets

TIRE

RELATED APPLICATIONS

This application claims the benefit of foreign priority to Japanese Patent Applications No. JP2022-071748, filed Apr. 25, 2022, which are incorporated by reference in its entirety.

FIELD OF THE INVENTION

The present disclosure relates to a tire.

BACKGROUND OF THE INVENTION

Japanese Unexamined Patent Application Publication No. H9-136515 (Patent Literature 1) has proposed a pneumatic tire having a tread surface provided with grooves. The grooves have groove walls provided with cut-out portions so that the groove walls have zigzag shapes on the tread surface.

SUMMARY OF THE INVENTION

The cut-out portions in the Patent Literature 1 have not been effective enough to compact the snow on a road surface, and there has been room for further improvement in on-snow traction performance.

The present disclosure was made in view of the above, and a primary object thereof is to provide a tire capable of further improving the on-snow traction performance.

The present disclosure is a tire including:
- a tread portion provided with one or more blocks each demarcated by grooves, wherein
- the or each block has a block ground contacting surface and a block wall surface facing one of the grooves and extending inwards in a tire radial direction from the block ground contacting surface to a groove bottom of the one of the grooves,
- the block wall surface is provided with a plurality of first recesses,
- each of the first recesses is formed so as to extend across the block ground contacting surface and the block wall surface,
- each of the first recesses has a triangular ground contacting surface opening on the block ground contacting surface and a triangular wall surface opening on the block wall surface, and
- the wall surface opening has a first end terminating without reaching the groove bottom.

By adopting the above configuration, it is possible that the tire of the present disclosure further improves the on-snow traction performance.

DETAILED DESCRIPTION OF THE INVENTION

An embodiment of the present disclosure will now be described below in conjunction with accompanying drawings.

Figure 1:
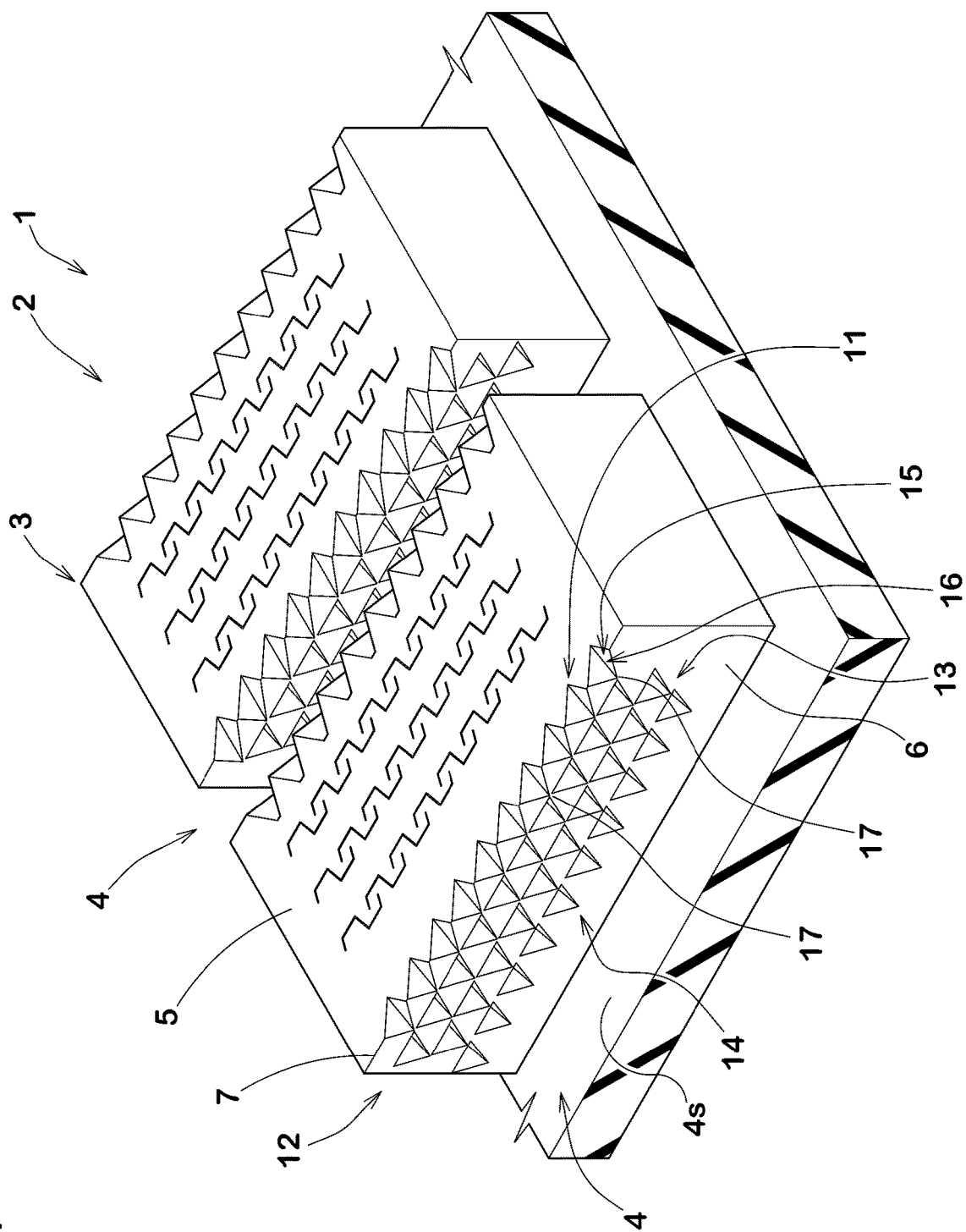
FIG. 1 is a perspective view of blocks of a tire showing an embodiment of the present disclosure.

FIG. 1 is an enlarged perspective view of a portion of a tread portion 2 of a tire 1 of the present embodiment. The tire 1 of the present embodiment is suitably used as a pneumatic tire for passenger cars suitable for running on snowy roads, especially on roads covered with compacted snow, for example. The present disclosure may be applied not only to heavy-duty pneumatic tires, but also to non-pneumatic tires not filled with pressurized air.

As shown in FIG. 1, the tread portion 2 is provided with at least one block 3 (a plurality of the blocks 3 in the present embodiment) and grooves 4 demarcating the block 3 (the blocks 3 in the present embodiment). The groove 4 is a groove-shaped body with a groove width greater than 1.5 mm, which is clearly distinguished in the present specification from an incised sipe with a width of 1.5 mm or less.

Each of the blocks 3 has a block ground contacting surface 5 and block wall surfaces 6 extending inwards in a tire radial direction from the block ground contacting surface 5 to groove bottoms (4s) of the grooves 4. In each of the blocks 3, each of the block wall surfaces 6 is connected with the block ground contacting surface 5 via a respective one of block edges 7, for example.

In the case of a pneumatic tire, when the tire 1 in a standard state is in contact with a flat surface with zero camber angle by being loaded with a standard tire load, the block ground contacting surface 5 is the surface contacting the flat surface The term "standard state" refers to the state in which the tire is mounted on a standard rim, inflated to a standard inner pressure, and loaded with no tire load, in the case of a pneumatic tire for which various standards have been established. In the case of tires for which various standards have not been established or non-pneumatic tires, the standard state means a standard use state according to the purpose of use of the tire and being loaded with no tire load. In the present specification, unless otherwise specified, the dimensions of various parts of the tire 1 are the values measured in the standard state.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The term "standard tire load" refers to a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. In the case of tires for which various standards have not been established, the term "standard tire load" refers to the maximum applicable load for the use of the tire according to the above-mentioned standards.

The block wall surfaces 6 are provided with a plurality of first recesses 11. Each of the first recesses 11 is formed so as to extend across the block ground contacting surface 5 and a respective one of the block wall surfaces 6. Each of the first recesses 11 has a triangular-shaped ground contacting surface opening 15 (shown in FIG. 4A) on the block ground contacting surface 5. Further, each of the first recesses 11 also has a triangular-shaped wall surface opening 16 (shown in FIG. 2) on a respective one of the block wall surfaces 6. The first recesses 11 configured as such are capable of capturing and compacting snow within the first recesses 11 when running on snow-covered roads. The above-mentioned "triangular-shaped" includes equilateral triangles as well as various other triangles such as isosceles triangles.

Figure 2:
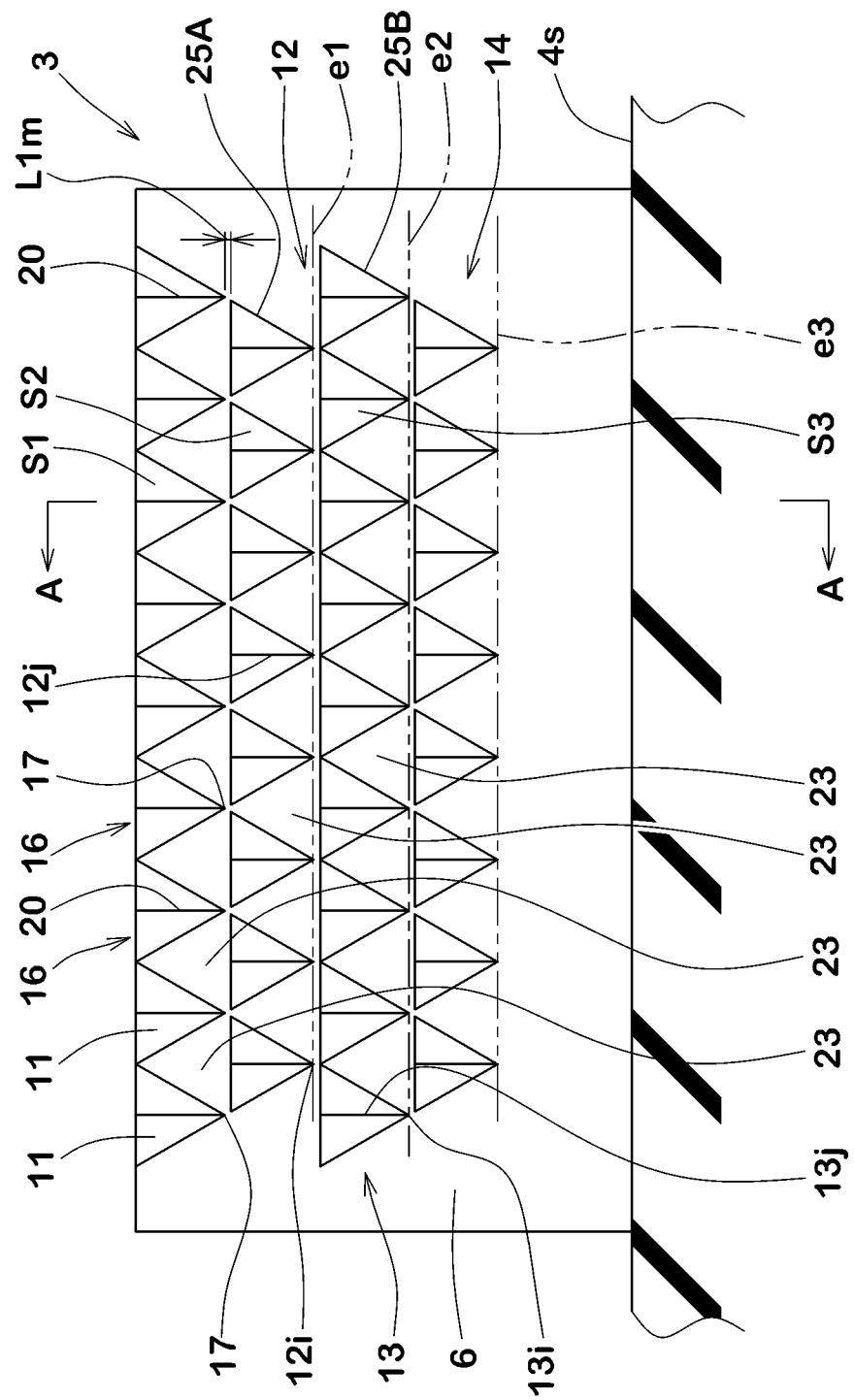
FIG. 2 is a front view of a block wall surface of one of the blocks of FIG. 1.

FIG. 2 is a front view of one of the block wall surfaces 6. As shown in FIGS. 1 and 2, each of the wall surface openings 16 has a first end 17 terminating without reaching a respective one of the groove bottoms (4s). This allows the snow to be compacted more strongly compared to a recess (not shown) with the wall surface opening 16 reaching a respective one of the groove bottoms (4s). Therefore, the tire 1 can further improve the on-snow traction performance.

Figure 3:
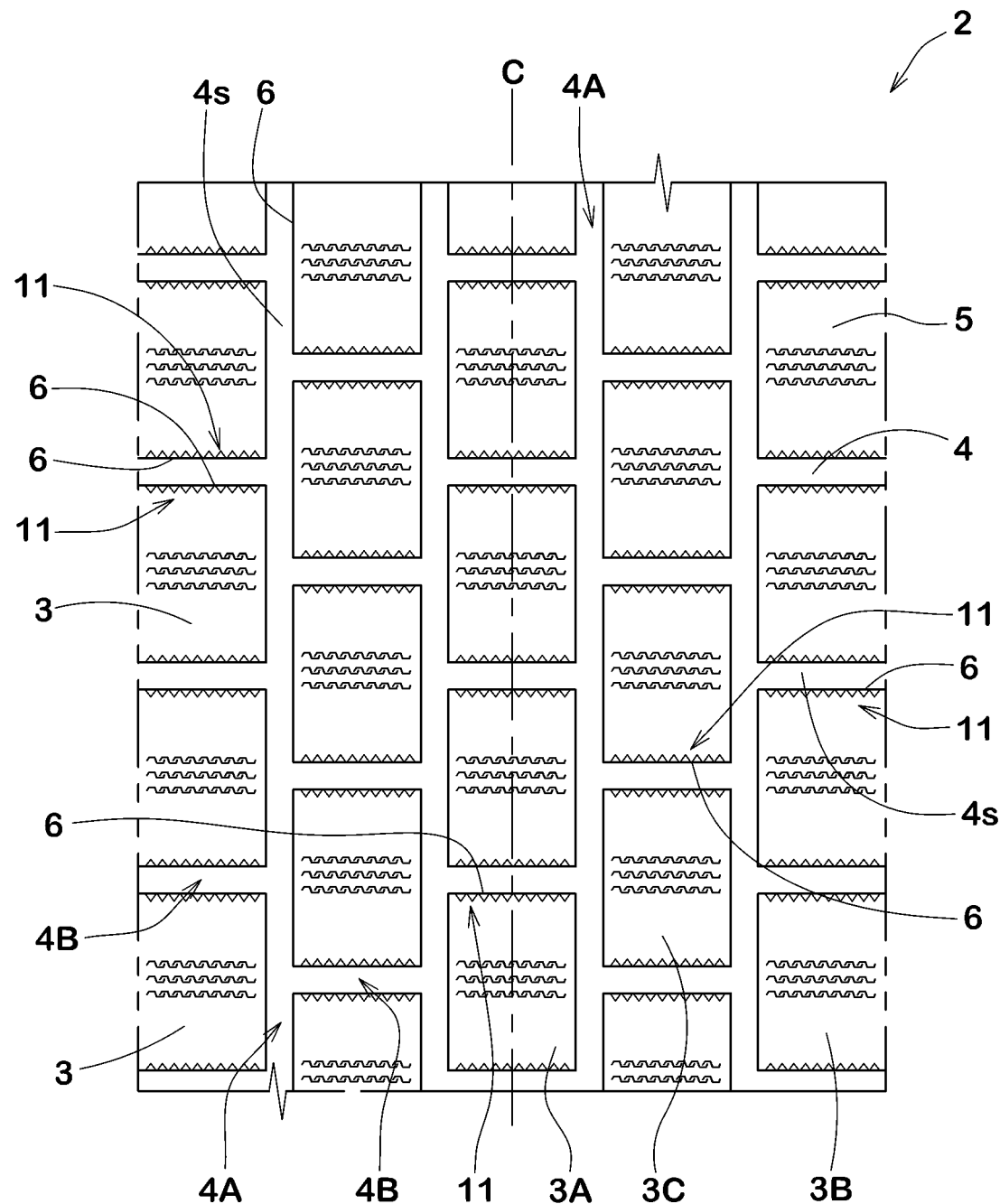
FIG. 3 is a development plan view of a tread portion of the tire.

FIG. 3 is a plan view of the tread portion 2 in the present embodiment. As shown in FIG. 3, the tread portion 2 in the present embodiment is formed to have the blocks 3 arranged in a tire circumferential direction and a tire axial direction. Further, the grooves 4 include a plurality of circumferential grooves 4A extending continuously in the tire circumferential direction and axial grooves 4B extending in the tire axial direction. Each of the circumferential grooves 4A and each of the axial grooves 4B extends linearly in the present embodiment. Each of the circumferential grooves 4A and each of the axial grooves 4B can be formed in a well-known shape.

The blocks 3 include crown blocks 3A arranged on a tire equator (C) in a row, shoulder blocks 3B located axially outermost arranged in a pair of rows, and middle blocks 3C arranged in a pair of rows each located between the row of the crown blocks 3A and a respective one of the rows of the shoulder blocks 3B. The block ground contacting surface 5 of each of the blocks 3 has a rectangular contour shape. It should be noted that the tread pattern of the tread portion 2 is not limited to such a manner, and various well-known patterns can be adopted.

The first recesses 11 in the present embodiment are provided in the block wall surfaces 6 extending to the groove bottoms (4s) of the axial grooves 4B. The first recesses 11 are provided on the opposing block wall surfaces 6 on both sides of each of the axial grooves 4B, for example. The first recesses 11 are provided on the block wall surfaces 6 facing the axial grooves 4B demarcating the crown blocks 3A, on the block wall surfaces 6 facing the axial grooves 4B demarcating the shoulder blocks 3B, and on the block wall surfaces 6 facing the axial grooves 4B demarcating the middle blocks 3C, for example. As a result, driving force and braking force can be used to effectively shear snow blocks, thereby, it is possible that the on-snow traction performance is further improved. It should be noted that the first recesses 11 are not limited to such an arrangement. The first recesses 11 may be provided on the block wall surfaces 6 extending to the groove bottoms (4s) of the circumferential grooves 4A, for example. The first recesses 11 configured as such improve the on-snow traction performance during cornering.

Figure 4A:
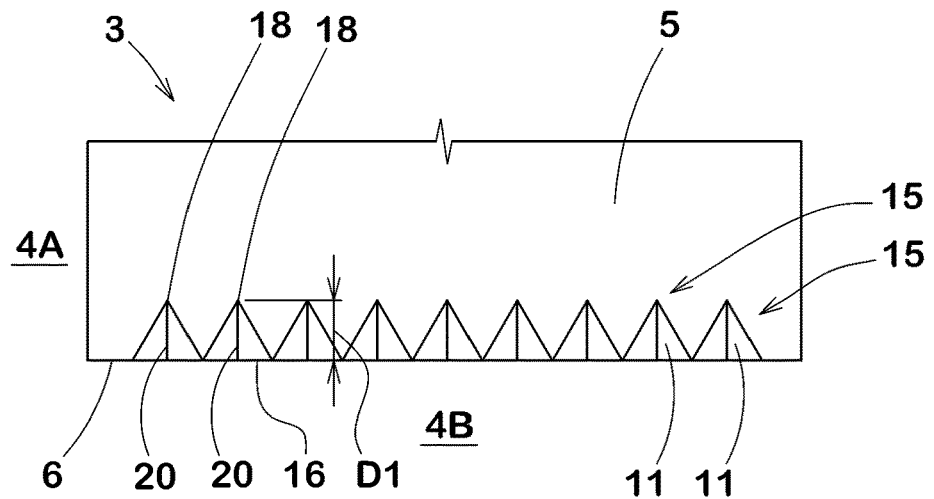
FIG. 4A is an enlarged plan view of a portion of a block ground contacting surface of one of the blocks.
Figure 4B:
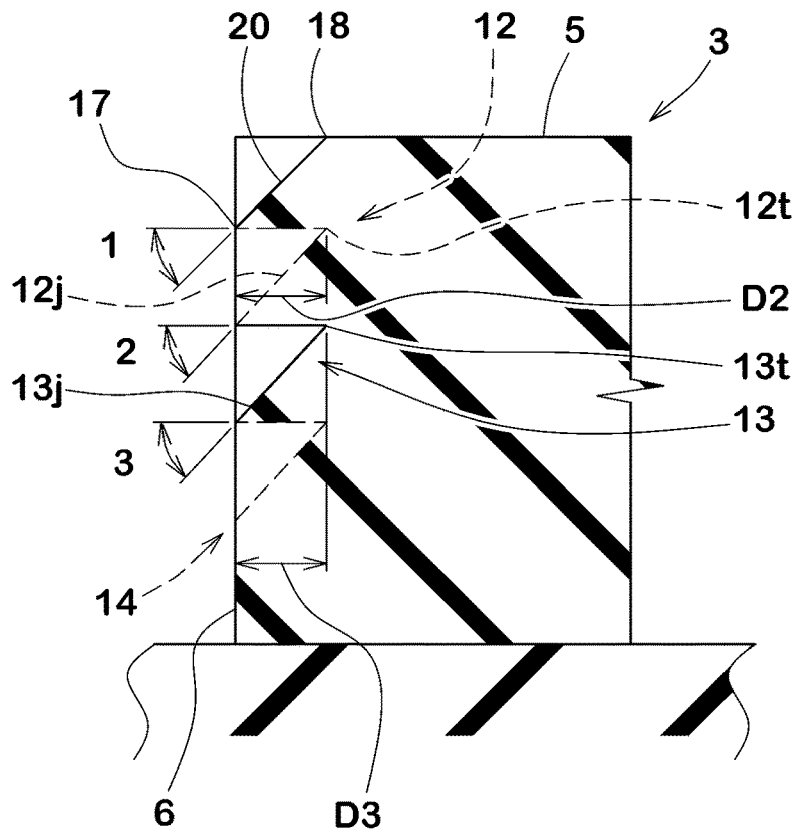
FIG. 4B is a cross-sectional view of one of the blocks taken along A-A line shown in FIG. 2.

FIG. 4A is a partial plan view of the block ground contacting surface 5 of one of the blocks 3. FIG. 4B is a cross-sectional view taken along A-A line shown in FIG. 2, showing a block cross section perpendicular to the block ground contacting surface 5. As shown in FIG. 4A and FIG. 4B, each of the ground contacting surface openings 15 has a second end 18 terminating in the block ground contacting surface 5 at a location apart from the block wall surface 6. And each of the first recesses 11 has a valley line 20 extending from the first end 17 to the second end 18. Thus, the valley line 20 in the present embodiment extends linearly and radially outward from the first end 17, inclining away from the block wall surface 6 in each of the first recesses 11. This allows the valley lines 20 to form more firm snow blocks when the block ground contacting surface 5 contacts the ground, since the valley lines 20 exerts a force in the direction toward the road surface on the snow captured within the first recesses 11. In addition, at the valley lines 20 of the first recesses 11 provided on the block wall surfaces 6 facing the axial grooves 4B, the driving force and the breaking force can be used to push the snow blocks in a direction orthogonal to the axial grooves 4B, therefore, a snow removal effect is exerted.

In a block cross section passing all through the valley line 20 and perpendicular to the block ground contacting surface 5, it is preferred that an angle α1 of the valley line 20 relative to the block ground contacting surface 5 is from 20 to 60 degrees. Since the angle α1 is 20 degrees or more, the volume in each of the first recesses 11 can be secured to form a large snow block. Since the angle α1 is 60 degrees or less, the snow captured within each of the first recesses 11 can be effectively subjected to the force in the direction toward the road surface. In order to effectively achieve this effect, the angle α1 is more preferably 30 degrees or more, and more preferably 50 degrees or less.

Figure 5:
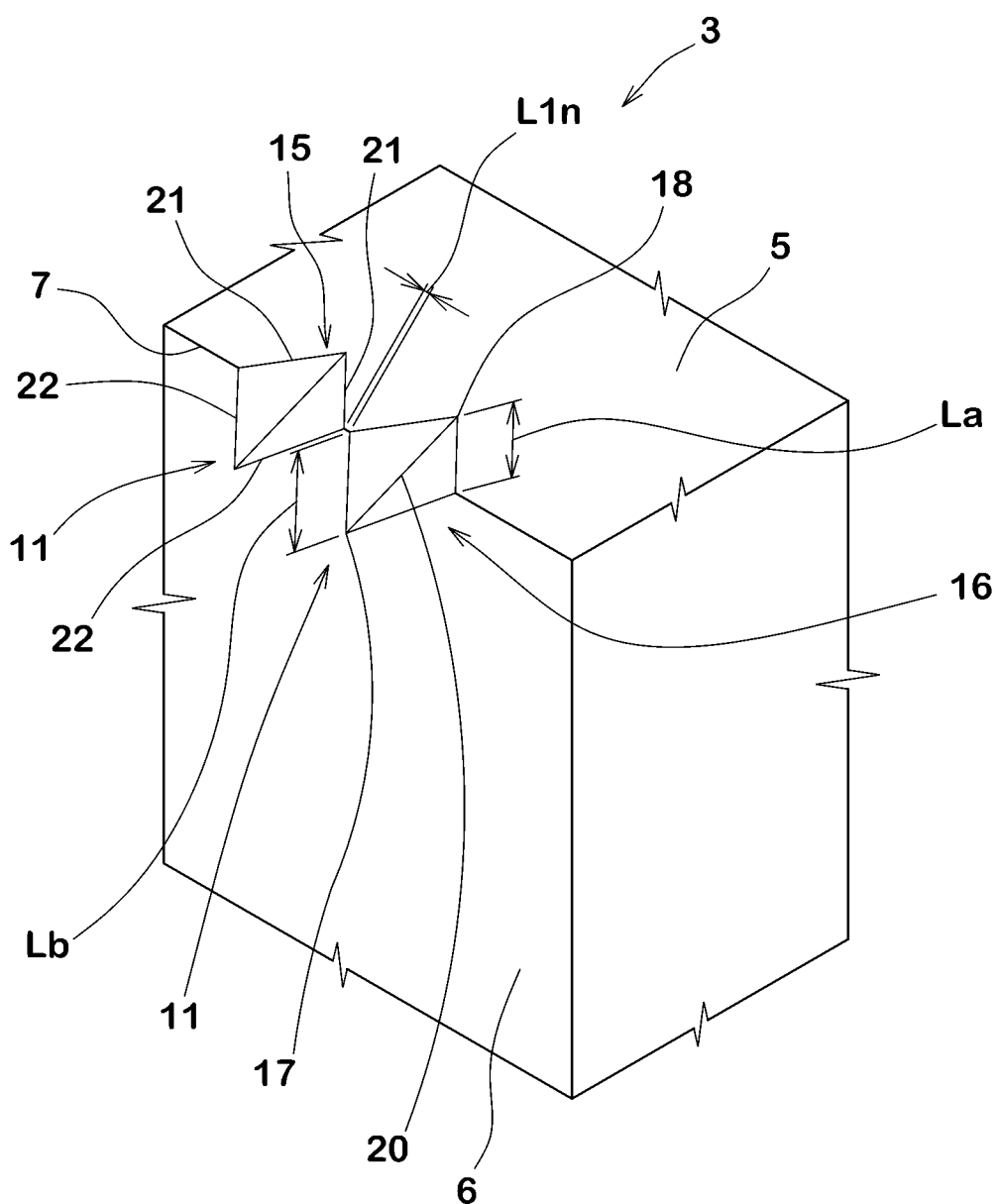
FIG. 5 is a partial perspective view of one of the blocks to illustrate first recesses.

FIG. 5 is a schematic partial perspective view of one of the blocks 3 to illustrate the first recesses 11. As shown in FIG. 5, each of the ground contacting surface openings 15 has a pair of first edges 21 extending in a tapering manner from the block wall surface 6 (block edge 7). Further, each of the wall surface openings 16 has a pair of second edges 22 extending in a tapered manner from the block ground contacting surface 5 (block edges 7). The pair of the first edges 21 are connected at the second end 18, for example. The pair of the second edges 22 are connected at the first end 17, for example.

Each of the first edges 21 has a length (La) of 1 mm or more and 5 mm or less. If the length (La) is excessively large, the snow captured within the first recesses 11 may not be compressed hard enough. If the length (La) is excessively small, the volume of the snow block formed within each of the first recesses 11 is reduced, therefore, the on-snow traction performance may decrease. For this reason, the length (La) is more preferably 2 mm or more and more preferably 3 mm or less. From the same perspective, a length (Lb) of each of the second edges 22 is preferably 1 mm or more, more preferably 2 mm or more, and preferably 5 mm or less, more preferably 3 mm or less.

It is preferred that a minimum distance (L1n) between the first recesses 11 adjacent to each other is 2 mm or less. This allows more snow blocks to be formed, thereby, it is possible that high on-snow traction performance is exerted. Since the ground contacting surface opening 15 and the wall surface opening 16 of each of the first recesses 11 are triangular in shape, when the first recesses 11 are lined up, the minimum distance (L1n) can be smaller compared to, for example, those in which the ground contacting surface openings 15 and the wall surface openings 16 are square-shaped (not shown). Therefore, the first recesses 11 in the present embodiment can exert greater snow shearing force. In the present disclosure, the minimum distance (L1n) is set to 0 mm.

As shown in FIGS. 1, 2 and 4B, the block wall surfaces 6 are provided with a plurality of second recesses 12 arranged radially inside the first recesses 11. Further, the block wall surfaces 6 are provided with a plurality of third recesses 13 arranged radially inside the second recesses 12. In each of the blocks 3, each of the second recesses 12 is recessed from the block wall surface 6 so as to have a triangular-shaped opening 25A formed on the block wall surface 6. Further, in each of the blocks 3, each of the third recesses 13 is recessed to have a triangular-shaped opening 25B formed on the block wall surface 6. After the first recesses 11 have worn off, the second recesses 12 configured as such appear on the block ground contacting surfaces 5, form snow blocks between the road surface, and exert shearing forces. After the second recesses 12 have worn off, the third recesses 13 appear on the block ground contacting surfaces 5, form snow blocks between the road surface, and exert shearing forces. As just described above, the tire 1 of the present embodiment improves the on-snow traction performance over a long period of time. A minimum distance (L1m) in the tire radial direction between one of the first recesses 11 and one of the second recesses 12 adjacent to each other is preferably 2 mm or less, and more preferably 1 mm or less. In the present disclosure, the minimum distance (L1m) is set to 0 mm.

Each of the second recesses 12 is concave in a cone or pyramid shape so as to form the opening 25A, for example. Each of the second recesses 12 is recessed in a triangular pyramid shape so as to have the triangular opening 25A in the present embodiment. Each of the third recesses 13 is concave in a cone or pyramid shape so as to form the opening 25B, for example. Each of the third recesses 13 is recessed in a triangular pyramid shape so as to have the triangular opening 25B in the present embodiment. This allows for easy snow removal from within each of the recesses 12 and 13.

In a front view of the block wall surface 6, the opening 25A of each of the second recesses 12 has a contour shape tapering radially inward, for example, an inverted triangle. Further, the opening 25B of each of the third recesses 13 has a contour shape tapering radially inward, for example, an inverted triangle. The second recesses 12 configured as such are able to form harder snow blocks after the first recesses 11 have worn off. Further, the third recesses 13 configured as such are able to form more firm snow blocks after the second recesses 12 have worn off.

Each of the second recesses 12 includes, for example, a second recess end (12t) (shown in FIG. 4B) that is the most distant from the block wall surface 6, a second inner end (12i) (shown in FIG. 2) in the tire radial direction of the opening 25A, and a second valley line (12j) connecting the second recess end (12t) and the second inner end (12i). The second valley line (12j) extends radially outward from the second inner end (12i) to the second recess end (12t) so as to be continuously inclined. This allows the load from the vehicle to effectively act from the second valley line (12j) on the snow taken into each of the second recesses 12, thereby, it is possible that more compacted and harder snow blocks are formed.

Similarly, each of the third recesses 13 includes, for example, a third recess end (13t) (shown in FIG. 4B) that is the most distant from the block wall surface 6, a third inner end (13i) (shown in FIG. 2) in the tire radial direction of the opening 25B, and a third valley line (13j) connecting the third recess end (13t) and the third inner end (13i). The third valley line (13j) extends radially outward from the third inner end (13i) to the third recess end (13t) so as to be continuously inclined.

The second valley line (12j) has an angle α2 that is the same as the angle α1 of the valley line 20 of each of the first recesses 11, for example. The third valley line (13j) has an angle α3 that is the same as the angle α2 of the second valley line (12j) in the present embodiment. Therefore, the same magnitude of the snow shearing force can be exerted from the first recesses 11 through the third recesses 13. The angle α2 is the angle of the second valley line (12j) relative to (a plane parallel to) the block ground contacting surface 5 in a block cross section passing all through the second valley line (12j) and perpendicular to the block ground contacting surface 5. The angle α3 is the angle of the third valley line (13j) relative to (a plane parallel to) the block ground contacting surface 5 in a block cross section passing all through the third valley line (13j) and perpendicular to the block ground contacting surface 5.

From the same point of view, it is more preferred that each of the second recesses 12 has a recess depth D2 that is the same length as a recess depth D1 of each of the first recesses 11. It should be noted that the recess depth D1 is a depth or length in a direction in which each of the first recesses 11 is recessed from and orthogonal to the block wall surface 6 as shown in FIG. 4B. The same applies to the recess depths D2 and D3. It is preferred that each of the third recesses 13 has a recess depth D3 that is the same length as the recess depth D2 of each of the second recesses 12. The recess depth D1 of each of the first recesses 11 is the shortest distance between the block wall surface 6 (the wall surface opening 16) and the second end 18 thereof. The recess depth D2 of each of the second recesses 12 is the shortest distance between the block wall surface 6 and the second recess end (12t) thereof. The recess depth D3 of each of the third recesses 13 is the shortest distance between the block wall surface 6 and the third recess end (13t) thereof.

The second recesses 12 are each lined up at a first position (e1) (shown in FIG. 2) in the tire radial direction, for example. In the present embodiment, the second recesses 12 are arranged so that each of the second inner ends (12i) in the tire radial direction of the openings 25A of the second recesses 12 touches (is tangent to) the first position (e1) line. The third recesses 13 are lined up at a second position (e2) in the tire radial direction, for example. The third recesses 13 are arranged so that each of the third inner ends (13i) in the tire radial direction of the openings 25B of the third recesses 13 touches (is tangent to) the second position (e2) line.

As shown in FIG. 2, in the front view of the block wall surface 6, the second recesses 12 are misaligned with the first recesses 11 and the third recesses 13 in a longitudinal direction of the block wall surface 6 (orthogonal to the tire radial direction). This reduces rigidity difference of each of the blocks 3. Further, in the front view of the block wall surface 6, the first recesses 11 and the third recesses 13 are arranged at the same positions so as to be aligned with each other in the longitudinal direction of the block wall surface 6. The second recesses 12 are displaced by half a pitch in the longitudinal direction of the block wall surface 6 from the first recesses 11 and the third recesses 13 in the present embodiment.

Each of the blocks 3 includes, on the block wall surface 6, block convexities 23 each surrounded by the adjacent first recesses 11 and one of the second recesses 12 located radially inside these first recesses 11. Each of the block convexities 23 in the present embodiment has a triangular surface with a corner pointing toward the block ground contacting surface 5, which has a high piercing effect on the roads covered with compacted snow, thereby, the on-snow traction performance can be further improved. When the first recesses 11 wear off, the block convexities each surrounded by the adjacent second recesses 12 and one of the third recesses 13 located radially inside these second recesses 12 appear on the block ground contacting surface 5. Further, when the second recesses 12 wear off, the block convexities 23 each surrounded by the adjacent third recesses 13 and one of later-described fourth recesses 14 located radially inside these third recesses 12 appear on the block ground contacting surface 5.

In the front view of each of the block wall surfaces 6 in the present embodiment, an opening area S1 of the wall surface opening 16 of each of the first recesses 11 is the same as an opening area S2 of the opening 25A of each of the second recesses 12. It should be noted that the opening area S1 is surrounded (demarcated) by the second edges 22 and an extension of the block ground contacting surface 5 (i.e., an extension of the block edge 7). Further, the opening area S2 of the opening 25A of each of the second recesses 12 is the same as an opening area S3 of the opening 25B of each of the third recesses 13. As just described, the opening areas S1 to S3 of the recesses 11 to 13 are the same in the present embodiment. In other words, the first recesses 11, the second recesses 12, and the third recesses 13 have the same shape. It should be noted that the shape of each of the first recesses 11 is regarded as if the ground contacting surface opening 15 is filled by virtual extension of the block ground contacting surface 5. In the blocks 3 configured as such, each of the recesses 11 to 13 exerts the same snow compaction effect, which helps to improve the on-snow traction performance. In the present specification, the above-mentioned "same" includes differences in opening area due to precision errors in tire manufacturing.

Each of the block wall surfaces 6 in the present embodiment is provided with a plurality of the fourth recesses 14 formed radially inside the third recesses 13. The fourth recesses 14 are arranged at a third position (e3) (shown in FIG. 2) in the tire radial direction, for example. The fourth recesses 14 are formed in the same shape as the second recesses 12 in the present embodiment. When the third recesses 13 wear off, the fourth recesses 14 configured as such appear on the block ground contacting surface 5 and form snow blocks between the road surface to exert the snow shearing forces. It should be noted that the block wall surfaces 6 may, for example, have a plurality of fifth recesses (not shown) arranged radially inside the fourth recesses 14, and may have a plurality of sixth recesses (not shown) arranged radially inside the fifth recesses. It is preferred that the fourth recesses 14, the fifth recesses, and the sixth recesses are formed in the same shape as the second recesses 12 or the third recesses 13, for example.

Figure 6:
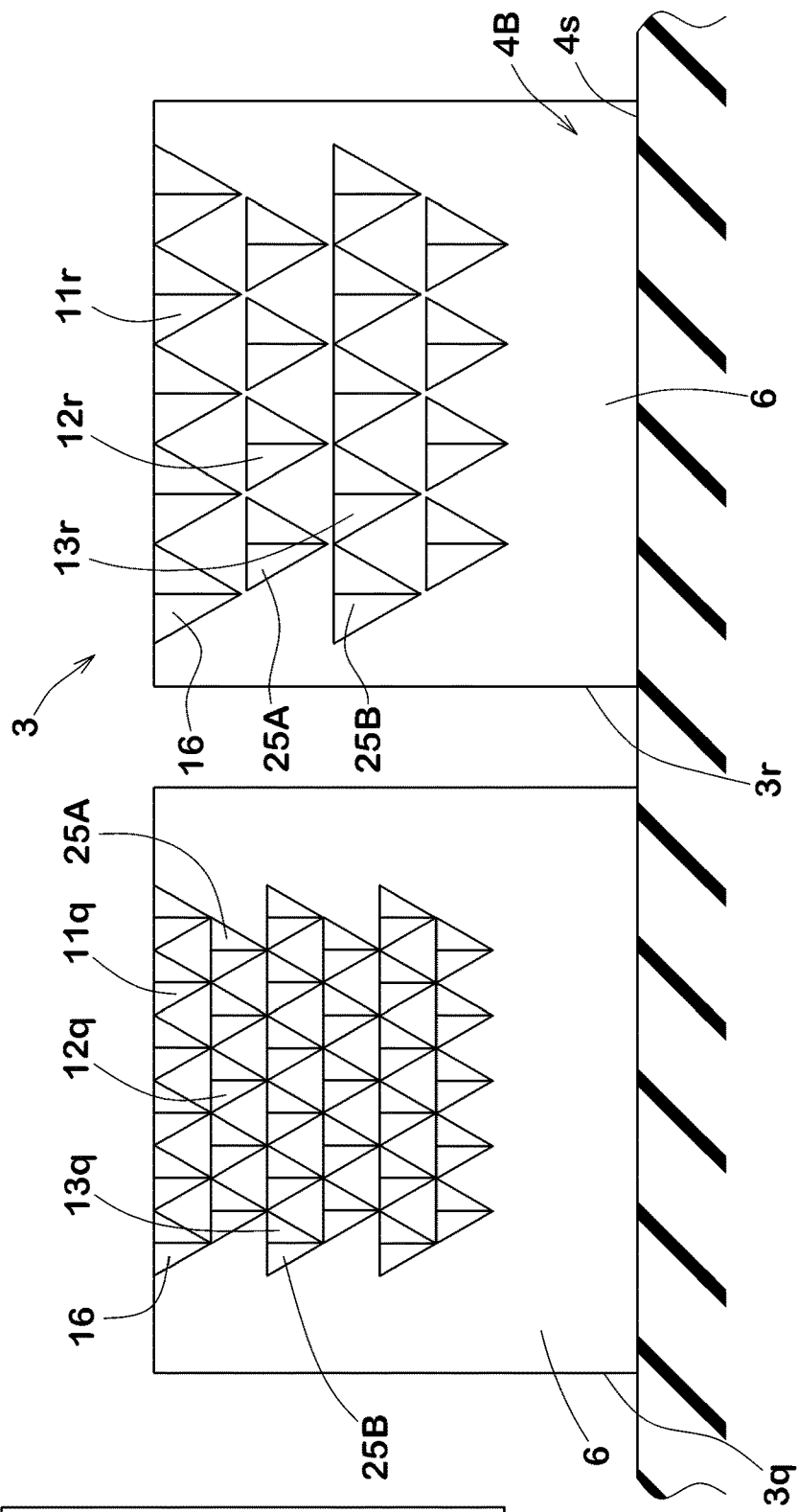
FIG. 6 is a front view of the block wall surfaces of the blocks according to another embodiment of the present disclosure.

FIG. 6 is a front view of one of the block wall surfaces 6 according to another embodiment. The same components as those in the previously described embodiment are denoted by the same reference numerals and the description thereof may be omitted. As shown in FIG. 6, in the present embodiment, the blocks 3 include outer blocks (3r) and inner blocks (3q) arranged adjacent to and axially inside the outer blocks (3r). It should be noted that the outer blocks (3r) are arranged in a circumferential row and the inner blocks (3q) are arranged in a circumferential row and that only one of the outer blocks (3r) and one of the inner blocks (3q) are shown in FIG. 6.

The outer blocks (3r) are provided with first recesses (11r) (outer first recesses) each having a volume larger than a volume of each of first recesses (11q) (inner first recesses) provided in the inner blocks (3q), for example. The outer blocks (3r) are provided with second recesses (12r) each having a volume larger than a volume of each of second recesses (12q) provided in the inner blocks (3q), for example. The outer blocks (3r) are provided with third recesses (13r) each having a volume larger than a volume of each of third recesses (13q) provided in the inner blocks (3q), for example. As a result, the outer blocks (3r) deform more than the inner blocks (3q) during cornering when a large lateral force acts on them, therefore, the snow shearing force can be increased in the first recesses (11r), the second recesses (12r), and the third recesses (13r). Thereby, the on-snow traction performance during cornering is improved. It should be noted that the first recesses (11r) (and also the second recesses (12r) and the third recesses (13r)) may be arranged in an axially outer part and the first recesses (11q) (and also the second recesses (12q) and the third recesses (13q)) may be arranged in an axially inner part of a single block 3.

In the outer blocks (3r), the wall surface opening 16 of each of the first recesses (11r) has an opening area same as an opening area of the opening 25A of each of the second recesses (12r) and an opening area of the opening 25B of each of the third recesses (13r), for example. Further, in the inner blocks (3q), the wall surface opening 16 of each of the first recesses (11q) has an opening area same as an opening area of the opening 25A of each of the second recesses (12q) and an opening area of the opening 25B of each of the third recesses (13q), for example.

Figure 7A:
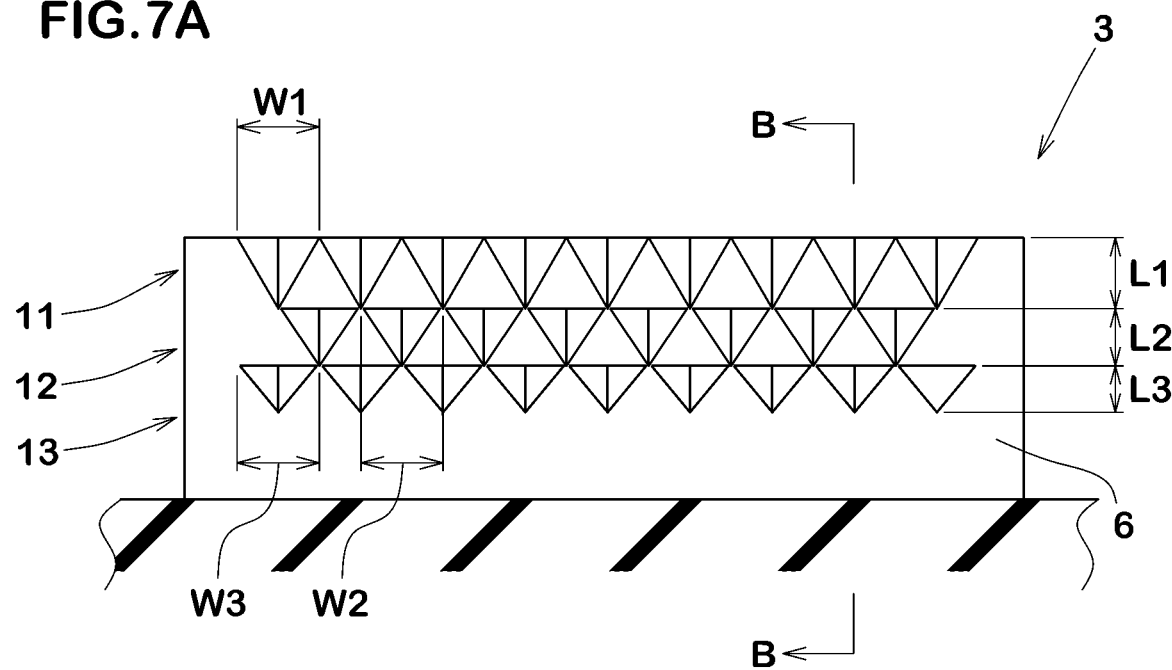
FIG. 7A is a front view of the block wall surface of one of the blocks according to yet another embodiment.
Figure 7B:
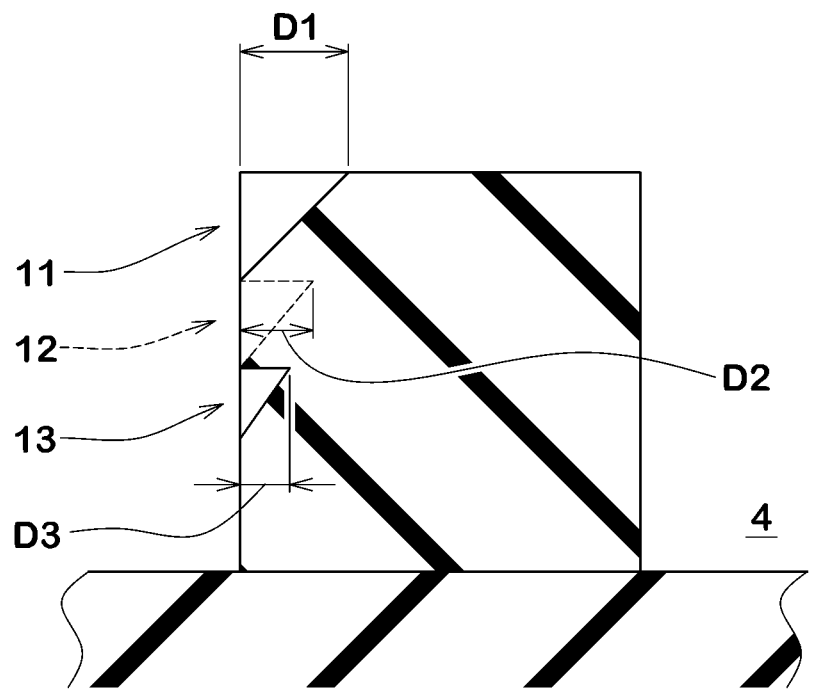
FIG. 7B is a cross-sectional view of one of the blocks taken along B-B line shown in FIG. 7A.

FIG. 7A is a front view of one of the block wall surfaces 6 according to yet another embodiment. FIG. 7B is a cross-sectional view taken along B-B line shown in FIG. 7A. The same components as those in the previously described embodiments are denoted by the same reference numerals and the description thereof may be omitted. As shown in FIGS. 7A and 7B, each of the block wall surfaces 6 in this embodiment is provided with a plurality of the first recesses 11, the second recesses 12, and the third recesses 13.

Generally, a tire is manufactured by vulcanizing a green tire put into a vulcanization mold (not shown). The vulcanization mold for manufacturing the tire 1 of the present disclosure is provided with convex portions that form the inverted pattern of the first recesses 11 through the third recesses 13, and thus the first recesses 11 through the third recesses 13 are formed when the green tire is vulcanized. Therefore, when vulcanization is finished, the convex portions of the vulcanization mold are engaged with the second recesses 12 and the third recesses 13 of the tire 1. Each of the second recesses 12 in the present embodiment has a length L2 in the tire radial direction smaller than a length L1 in the tire radial direction of each of the first recesses 11. Further, each of the third recesses 13 has a length L3 in the tire radial direction smaller than the length L2 of each of the second recesses 12. As a result, the engagement of the second recesses 12 and the third recesses 13 with the convex portions of the vulcanization mold is small, which makes it easier to remove the tire 1 from the vulcanization mold.

Further in general, when running on roads covered with compacted snow, snow taken in the grooves 4 rarely reaches the groove bottoms (4s) at the early stage of wear, and is less likely to be hardened by the grooves 4. Furthermore, at the late stage of wear, the depths of the grooves 4 become smaller, therefore, snow taken in the grooves 4 reaches the groove bottoms (4s), and is likely to be strongly compacted by the groove bottoms (4s). In this embodiment, the snow shearing force is maintained high in the early stage of wear since the first recesses 11 having the large length L1 are able to compact the snow. Further, at the late stage of wear, the first recesses 11 disappear and only the second recesses 12 and/or the third recesses 13 appear on the block ground contacting surfaces 5 and the block wall surfaces 6. The length L2 of each of the second recesses 12 and the length L3 of each of the third recesses 13 are smaller than the length L1 of each of the first recesses 11, but the grooves 4 themselves and the second recesses 12 and/or the third recesses 13 form hard snow blocks, the snow shearing force is maintained high even at the late stage of wear. In order to effectively exert such an action, it is preferred that the third recesses 13 are provided so as to appear on the block ground contacting surfaces 5 when the grooves are 50% worn.

Although not particularly limited, the length L1 of each of the first recesses 11 is preferably 1.5 mm or more, further preferably 1.8 mm or more, and preferably 2.5 mm or less, further preferably 2.3 mm or less. The length L2 of each of the second recesses 12 is preferably 1.0 mm or more, further preferably 1.3 mm or more, and preferably 2.0 mm or less, further preferably 1.8 mm or less. The length L3 of each of the third recesses 13 is preferably 0.5 mm or more, further preferably 0.8 mm or more, and preferably 1.5 mm or less, further preferably 1.3 mm or less.

From a similar point of view, the recess depth D2 of each of the second recesses 12 is smaller than the recess depth D1 of each of the first recesses 11, for example. Further, the recess depth D3 of each of the third recesses 13 is smaller than the recess depth D2 of each of the second recesses 12, for example. It should be noted that each of the first recesses 11 in this embodiment has a width W1 which is the same as a width W2 of each of the second recesses 12 and a width W3 of each of the third recesses 13. The widths W1, W2, and W3 are the widths in a direction along the block edge 7 and in a longitudinal direction of one of the grooves 4 the first recesses 11, the second recesses 12, and the third recesses 13 face.

While detailed description has been made of the tire according to embodiments of the present disclosure, the present disclosure can be embodied in various forms without being limited to the illustrated embodiments.

Statement of Disclosure

The present disclosure includes the following aspects.

Present Disclosure 1

A tire including:
a tread portion provided with one or more blocks each demarcated by grooves, wherein
the or each block has a block ground contacting surface and a block wall surface facing one of the grooves and extending inwards in a tire radial direction from the block ground contacting surface to a groove bottom of the one of the grooves,
the block wall surface is provided with a plurality of first recesses,
each of the first recesses is formed so as to extend across the block ground contacting surface and the block wall surface,
each of the first recesses has a triangular ground contacting surface opening on the block ground contacting surface and a triangular wall surface opening on the block wall surface, and
the wall surface opening has a first end terminating without reaching the groove bottom.

Present Disclosure 2

The tire according to Present Disclosure 1, wherein the one of the grooves is an axial groove extending in a tire axial direction.

Present Disclosure 3

The tire according to Present Disclosure 1 or 2, wherein
in a plan view of the block ground contacting surface, the ground contacting surface opening has a second end at a location apart from the block wall surface,
each of the first recesses has a valley line extending from the first end to the second end,
in a block cross section passing all through the valley line and perpendicular to the block ground contacting surface, the valley line has an angle of 20 degrees or more and 60 degrees or less relative to the block ground contacting surface.

Present Disclosure 4

The tire according to any one of Present Disclosures 1 to 3, wherein
the ground contacting surface opening has a pair of first edges extending from the block wall surface in a tapered shape, and
each of the first edges has a length of 1 mm or more and 5 mm or less.

Present Disclosure 5

The tire according to any one of Present Disclosures 1 to 4, wherein
the wall surface opening has a pair of second edges extending from the block ground contacting surface in a tapered shape, and
each of the second edges has a length of 1 mm or more and 5 mm or less.

Present Disclosure 6

The tire according to any one of Present Disclosures 1 to 5, wherein
the block wall surface is provided with a plurality of second recesses arranged radially inside the first recesses, and
each of the second recesses is recessed to have a triangular opening on the block wall surface.

Present Disclosure 7

The tire according to Present Disclosure 6, wherein the opening of each of the second recesses has a contour shape tapering radially inward in a front view of the block wall surface.

Present Disclosure 8

The tire according to Present Disclosure 6 or 7, wherein the second recesses are arranged at a first position in the tire radial direction.

Present Disclosure 9

The tire according to any one of Present Disclosures 6 to 8, wherein
the block wall surface is provided with a plurality of third recesses arranged radially inside the second recesses, and
each of the third recesses is recessed to have a triangular opening on the block wall surface.

Present Disclosure 10

The tire according to Present Disclosure 9, wherein the opening of each of the third recesses has a contour shape tapering radially inward.

Present Disclosure 11

The tire according to Present Disclosure 9 or 10, wherein the third recesses are arranged at a second position in the tire radial direction.

Present Disclosure 12

The tire according to any one of Present Disclosures 9 to 11, wherein
each of the second recesses has a length in the tire radial direction smaller than a length in the tire radial direction of each of the first recesses, and
each of the third recesses has a length in the tire radial direction smaller than the length in the tire radial direction of each of the second recesses.

Present Disclosure 13

The tire according to any one of Present Disclosures 1 to 12, wherein a minimum distance between the first recesses adjacent to each other is 2 mm or less.

Present Disclosure 14

The tire according to any one of Present Disclosures 1 to 13, wherein
the one of the grooves is an axial groove extending in a tire axial direction,
the first recesses include outer first recesses arranged on an axially outer side and inner first recesses arranged on an axially inner side, and
each of the outer first recesses has a volume larger than a volume of each of the inner first recesses.

DESCRIPTION OF REFERENCE SIGNS 1 tire
2 tread portion
3 block
5 block ground contacting surface
6 block wall surface
11 first recess
15 ground contacting surface opening
16 wall surface opening
17 first end

The invention claimed is:
1. A tire comprising:
a tread portion provided with one or more blocks each demarcated by grooves, wherein
the or each block has a block ground contacting surface and a block wall surface facing one of the grooves and extending inwards in a tire radial direction from the block ground contacting surface to a groove bottom of the one of the grooves,
the block wall surface is provided with a plurality of first recesses,
each of the first recesses is formed so as to extend across the block ground contacting surface and the block wall surface,
each of the first recesses has a triangular ground contacting surface opening on the block ground contacting surface and a triangular wall surface opening on the block wall surface,
the wall surface opening has a first end terminating without reaching the groove bottom,
the block wall surface is provided with a plurality of second recesses arranged radially inside the first recesses, and
each of the second recesses is recessed to have a triangular opening on the block wall surface.

2. The tire according to claim 1, wherein the one of the grooves is an axial groove extending in a tire axial direction.

3. The tire according to claim 1, wherein
in a plan view of the block ground contacting surface, the ground contacting surface opening has a second end at a location apart from the block wall surface,
each of the first recesses has a valley line extending from the first end to the second end,
in a block cross section passing all through the valley line and perpendicular to the block ground contacting surface, the valley line has an angle of 20 degrees or more and 60 degrees or less relative to the block ground contacting surface.

4. The tire according to claim 1, wherein
the ground contacting surface opening has a pair of first edges extending from the block wall surface in a tapered shape, and
each of the first edges has a length of 1 mm or more and 5 mm or less.

5. The tire according to claim 1, wherein
the wall surface opening has a pair of second edges extending from the block ground contacting surface in a tapered shape, and
each of the second edges has a length of 1 mm or more and 5 mm or less.

6. The tire according to claim 1, wherein the opening of each of the second recesses has a contour shape tapering radially inward in a front view of the block wall surface.

7. The tire according to claim 1, wherein the second recesses are arranged at a first position in the tire radial direction.

8. The tire according to claim 7, wherein a minimum distance in the tire radial direction between one of the first recesses and one of the second recesses adjacent to each other is 2 mm or les.

9. The tire according to claim 1, wherein
the block wall surface is provided with a plurality of third recesses arranged radially inside the second recesses, and
each of the third recesses is recessed to have a triangular opening on the block wall surface.

10. The tire according to claim 9, wherein the opening of each of the third recesses has a contour shape tapering radially inward.

11. The tire according to claim 9, wherein the third recesses are arranged at a second position in the tire radial direction.

12. The tire according to claim 11, wherein the second position is a position where the third recesses appear on the block ground contacting surface when the one of the grooves is 50% worn.

13. The tire according to claim 9, wherein
each of the second recesses has a length in the tire radial direction smaller than a length in the tire radial direction of each of the first recesses, and
each of the third recesses has a length in the tire radial direction smaller than the length in the tire radial direction of each of the second recesses.

14. The tire according to claim 13, wherein
each of the second recesses has a recess depth smaller than a recess depth of each of the first recesses,
each of the third recesses has a recess depth smaller than the recess depth of each of the second recesses, and
the first recesses, the second recesses, and the third recesses have a same width in a longitudinal direction of the one of the grooves.

15. The tire according to claim 9, wherein the first recesses, the second recesses, and the third recesses have a same shape.

16. The tire according to claim 9, wherein
in a front view of the block wall surface, the second recesses are misaligned with the first recesses and the third recesses in a longitudinal direction of the block wall surface, the longitudinal direction being orthogonal to the tire radial direction, and
the first recesses and the third recesses are arranged at same positions in the longitudinal direction so as to be aligned with each other in the longitudinal direction.

17. The tire according to claim 1, wherein a minimum distance between the first recesses adjacent to each other is 2 mm or less.

18. The tire according to claim 1, wherein
the one of the grooves is an axial groove extending in a tire axial direction,
the tread portion is provided with a plurality of the blocks including an outer block and an inner block arranged axially inside the outer block,
the first recesses include outer first recesses arranged in the outer block and inner first recesses arranged in the inner block, and
each of the outer first recesses has a volume larger than a volume of each of the inner first recesses.

19. A tire comprising:
a tread portion provided with a plurality of blocks each demarcated by grooves, wherein
each of the blocks has a block ground contacting surface and a block wall surface facing one of the grooves and extending inwards in a tire radial direction from the block ground contacting surface to a groove bottom of the one of the grooves,
the block wall surface is provided with a plurality of first recesses,
each of the first recesses is formed so as to extend across the block ground contacting surface and the block wall surface,
each of the first recesses has a triangular ground contacting surface opening on the block ground contacting surface and a triangular wall surface opening on the block wall surface,
the wall surface opening has a first end terminating without reaching the groove bottom,
the one of the grooves is an axial groove extending in a tire axial direction,
the blocks include an outer block and an inner block arranged axially inside the outer block,
the first recesses include outer first recesses arranged in the outer block and inner first recesses arranged in the inner block,
each of the outer first recesses has a volume larger than a volume of each of the inner first recesses.

* * * * *